UNITED STATES PATENT OFFICE.

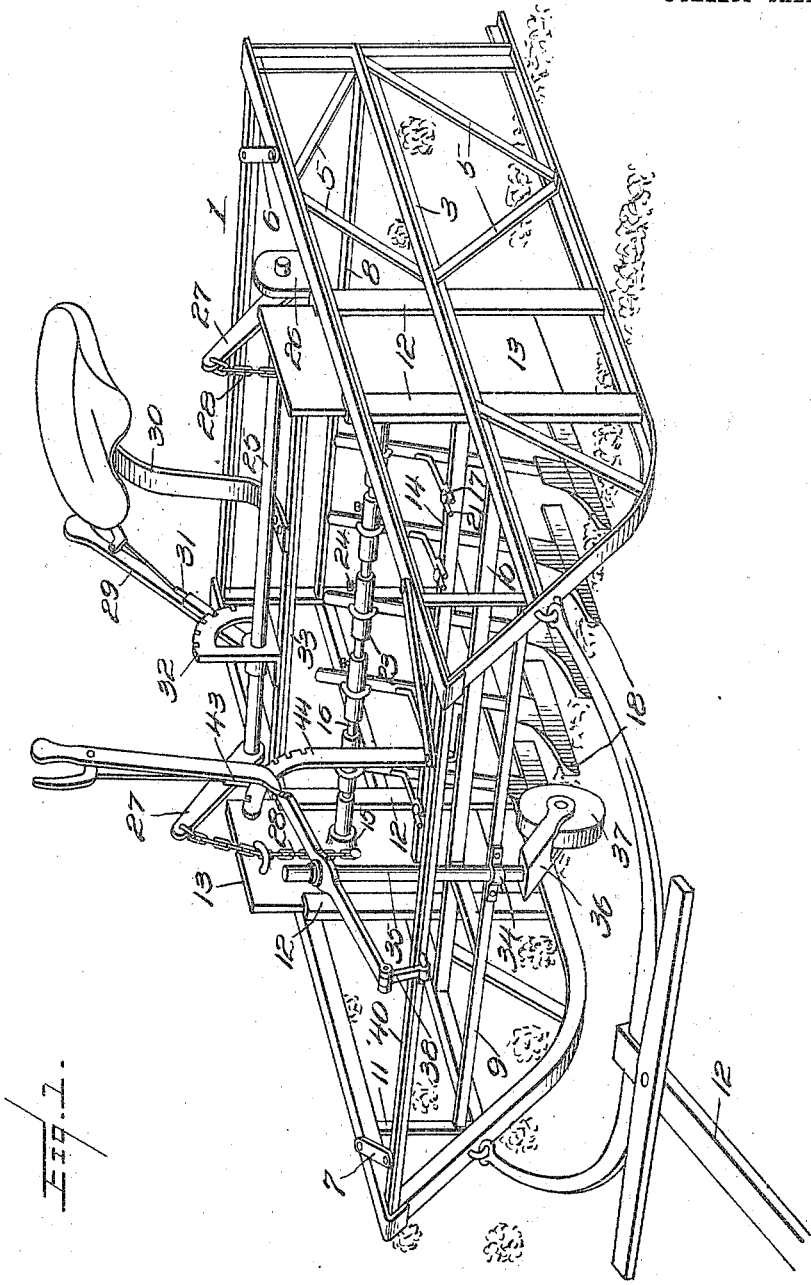

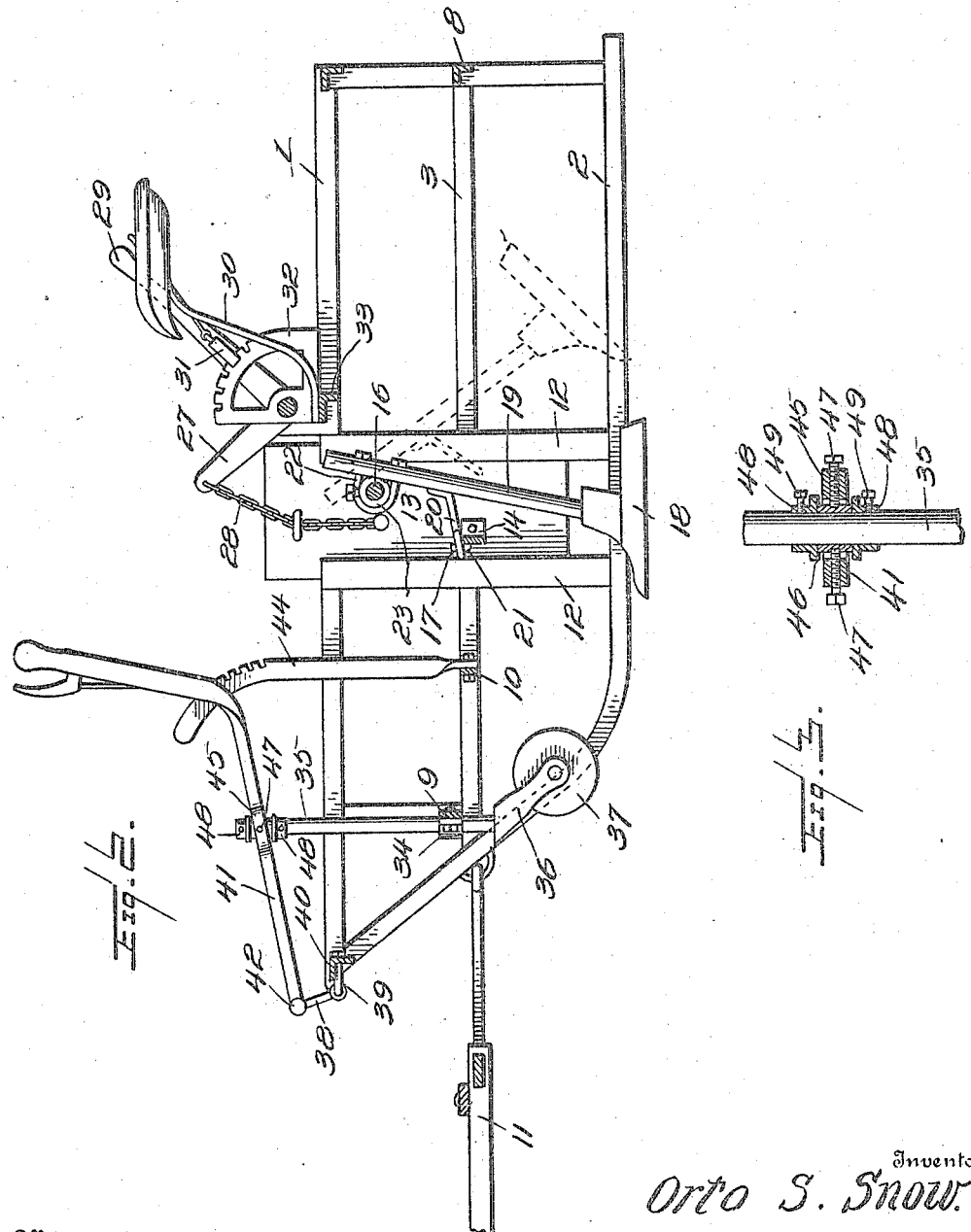

ORTO S. SNOW, OF NEAR GRAND VIEW, TEXAS, ASSIGNOR OF ONE-HALF TO BEAURY BOSWELL, OF GRAND VIEW, TEXAS.

COTTON-CHOPPER.

950,966.  Specification of Letters Patent.  Patented Mar. 1, 1910.

Application filed July 31, 1909. Serial No. 510,536.

*To all whom it may concern:*

Be it known that I, ORTO S. SNOW, a citizen of the United States, residing near Grand View, in the county of Johnson and State of Texas, have invented new and useful Improvements in Cotton-Choppers, of which the following is a specification.

This invention is an improved cotton chopper embodying a frame and a number of plows carried by the frame and adapted to be driven across the rows of cotton plants to chop out superfluous plants and leave the "stands" and the said invention consists in the construction, combination and arrangement of devices hereinafter described and claimed.

In the accompanying drawings:—Figure 1 is a cotton chopping machine constructed in accordance with this invention. Fig. 2 is a vertical longitudinal sectional view of the same. Fig. 3 is a detail view showing the standard of the caster wheel in elevation and the bearings and operating lever of the same in section.

In accordance with my invention, I provide a frame 1 which may be of the form here shown or of any other suitable construction and which has side runners 2. Each runner is here shown as of open construction and provided with a centrally disposed longitudinal brace rod 3 and with front and rear brace rods 4, 5. At the rear corners of the frame are diagonal braces 6. Similar braces 7 are at its front corners. A lower cross bar 8 which is in the same plane with the brace rods 3 connects the rear ends of the runners. Cross bars 9, 10 are near the front end of the frame, the former connecting vertical bars 11 which extend from near the front ends of the bars 3 to the upper sides of the runners and the latter which is at a distance in rear of the bar 9 connecting the said bars 3. A tongue or other suitable draft device 12 is connected to the front ends of the runners so that the machine may be readily drawn from place to place. The runners, which constitute the sides of the frame, are provided with vertical guides 12. Vertically disposed slides 13 operate and are movable vertically in said guides. The said slides are connected together by a cross bar 14 and are provided on their inner sides at a suitable distance from their upper ends with sockets 15 for the reception of and forming bearings for the ends of a shaft or bar 16. The cross bar 14 is provided with a series of upwardly extending stops 17 of which there are a suitable number appropriately spaced apart. A series of plows 18 are employed, each of which has a standard 19 provided on its front side with an arm 20 adapted to bear on the cross bar 14 and provided at its front end with a fork 21 to receive one of the stops 17. Each of the said standards is securely connected as by means of a U-bolt 22 to a sleeve 23, the said sleeves being placed on the shaft or rod 16 and being appropriately spaced apart and each provided with a set screw 24 to engage the shaft or rod 16, said set screws serving to secure the sleeves and hence the plows at the required distance apart. This construction and arrangement of devices also enables any required number of the plows to be employed and the spaces between the plows to be regulated, as will be understood.

A rock shaft 25 is mounted in bearings 26 on the sides of the frame and is provided with rock arms 27 which are connected as by means of chains 28 to the vertically movable slides 13. A hand lever 29 is secured to the said rock shaft at a point near the seat 30 and is provided with a dog 31 of ordinary construction which coacts with a segment 32 secured on a cross bar 33 of the frame to lock the rock shaft with its arms 27 in any desired position and hence maintain the plows, which are adjustable vertically by means of said rock shaft and the connections hereinbefore described, at any desired adjustment. The arms 20 of the plow standards are in practice made of steel or other material which while being stiff will bend under stress. The said arms serve to lock the standards of the plows in the operative position shown in full lines in Fig. 2 and maintain the standards in such position under ordinary circumstances. However, should a plow strike a rock, stump, or other unyielding obstruction, the standard will turn rearwardly to an inclined position such as indicated by dotted lines in Fig. 2, the arm 20 yielding sufficiently to permit this and hence injury to the plow or its standard will be prevented.

The cross bar 9 of the frame is provided at its center with a bearing 34 for a vertically movable standard 35 which has at its lower end a downwardly and rearwardly inclined fork 36 in which is mounted a caster wheel 37. A link 38 is pivotally connected at its lower end as at 39 to a cross bar 40 which is at the front end of the frame. To the upper end of the said link is pivotally connected one end of a hand lever 41 as at 42. Said hand lever has a dog 43 of usual construction which coacts with a segment 44 to secure the said lever at any desired adjustment, the said segment being mounted and secured on the cross bar 10 of the frame. The standard 35 passes through an opening in a bowed or widened portion 45 of the lever 41. A sleeve 46 is on that portion of the said standard which is within the said opening of the lever and is engaged on opposite sides by pivot screws 47 with which the said lever is provided so that said sleeve is pivotally connected to the said lever. Said sleeve is held in place on the standard by collars 48 which are above and below said sleeve and are provided with set screws 49 which engage said standard and secure said collars and hence said sleeve in place.

It will be understood from the foregoing description and by reference to the drawings that by appropriately moving the lever 41 the caster wheel 37 may be raised and lowered. When the machine is in operation in a field across cotton rows for chopping out cotton, the caster wheel is raised as indicated in Fig. 2 so that it does not engage the ground. When it is desired to turn the machine at the end of a row, the caster wheel is lowered to a sufficient extent to bear on the ground and raise the front ends of the runners and thus enable the machine to be turned without causing the runners by their side-wise motion to destroy cotton plants. By securing only a suitable number of standards on the shaft or bar 16, the machine may be used as a marker for marking off corn or other rows across the field as will be understood.

What is claimed is:—

In a cotton chopping machine, a frame, slides connected thereto for vertical movement, a shaft disposed transversely of the frame and attached to and movable with the slides, a cross bar also connecting the slides, plows having standards connected to the said shaft and arms on the said standards to bear on the said cross bar to maintain the standards in normal operative position and permit them to turn rearwardly when the plows encounter obstructions.

In testimony whereof I affix my signature in presence of two witnesses.

ORTO S. SNOW.

Witnesses:
T. H. HARRELL,
E. A. BEDICHEK.